No. 848,771. PATENTED APR. 2, 1907.
J. R. ROGERS.
LINOTYPE MACHINE.
APPLICATION FILED FEB. 17, 1906.
7 SHEETS—SHEET 1.

Fig.1.

No. 848,771. PATENTED APR. 2, 1907.
J. R. ROGERS.
LINOTYPE MACHINE.
APPLICATION FILED FEB. 17, 1906.

WITNESSES:
R. F. Barnes
L. E. Morrison

INVENTOR
J. R. Rogers
BY Philip T. Dodge
ATTORNEY

No. 848,771. PATENTED APR. 2, 1907.
J. R. ROGERS.
LINOTYPE MACHINE.
APPLICATION FILED FEB. 17, 1906.

WITNESSES:
R. J. Barnes.
L. E. Morrison.

INVENTOR
J. R. Rogers
BY
Philip T. Dodge
ATTORNEY

No. 848,771. PATENTED APR. 2, 1907.
J. R. ROGERS.
LINOTYPE MACHINE.
APPLICATION FILED FEB. 17, 1906.

WITNESSES
P. F. Barnes
L. E. Morrison

INVENTOR
J. R. Rogers
By Philip T. Dodge
Attorney

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINOTYPE-MACHINE.

No. 848,771.   Specification of Letters Patent.   Patented April 2, 1907.

Application filed February 17, 1906. Serial No. 301,665.

*To all whom it may concern:*

Be it known that I, JOHN R. ROGERS, of borough of Brooklyn, county of Kings, and State of New York, have invented a new and useful Improvement in Linotype-Machines, of which the following is a specification.

My invention has reference to linotype-machines of the general organization represented in Letters Patent of the United States No. 436,532, wherein circulating matrices are released from a magazine in the order in which their characters are to appear in print and assembled in line together with expanding spacers, the composed line transferred to the face of a mold, the mold filled with molten metal to form a slug or linotype against the matrices which produce the type characters thereon, and the matrices thereafter elevated and returned through a distributing mechanism to the magazine-channels from which they started.

The aim of the invention is to adapt a machine of this character to carry a number of fonts or sets of matrices representing different sizes or styles of type in such manner that any font may be brought into action instantly at will, so that a line may be produced with faces represented by the matrices in any one magazine or by a combination of faces represented by the matrices in two or more magazines.

A further object of the invention is to provide for the distribution of the matrices from the composed lines to their appropriate magazines without interrupting the composition of succeeding lines, and this whether the composed lines require to be distributed to one or more of the magazines. To this end I employ a series of magazines preferably superposed in combination with movable means for directing the matrices from the respective magazines to a common assembling mechanism. I also employ for actuating the escapements which release the matrices from the magazines means adjustable or shiftable bodily from one operative position to another in such manner as to coöperate with the escapements of one magazine or another, as demanded, the arrangement being such that the devices may coöperate with two, three, or more magazines. I also employ preliminary distributing means for delivering the matrices according to font from the composed lines to main distributers overlying the several magazines and each serving to return the matrices of one font to their appropriate channels in the adjacent magazine.

In the accompanying drawings I have represented my improvements as incorporated in a machine of the same general organization as the commercial Mergenthaler linotype-machine of the present day, and I have restricted the drawings to those parts of the machine which are necessary to an understanding of my improvements; but it is to be understood that the improvements may be employed in connection with any other suitable line-casting machine and that the details may be widely modified within the range of mechanical skill and without passing beyond the limits of my invention.

Referring to the drawings, Fig. 3ª is a side elevation showing the details of the devices for adjusting and locking the adjustable matrix guide or throat.

Referring to the drawings, A represents a rigid main frame, which may be of any form and construction adapted to sustain the various operative parts.

B is the inclined multiplex magazine, consisting of a series of superposed single magazines $b$ $b'$, &c., each channeled longitudinally and adapted to contain a font or set of matrices C.

D is a base-frame supporting the entire magazine and ordinarily fixed in position.

E E are centrally-pivoted lever-escapements to control the delivery of the matrices from the magazines. There is a series of escapements for each magazine, one for each channel, and a lifting-spring $e$ under the rear end of each escapement.

F is a vertically-sliding frame or sash mounted in the main frame and carrying a series of vertically-reciprocating slides G to actuate the escapements E, the vertical movement of the frame being for the purpose of adjusting the slides G in position to engage the escapements of one magazine or another, as required. The actuating slides or bars G are supported at their upper and lower ends in horizontal guide-bars H, the ends of which are sustained in horizontal slots $h$ in the sliding frame F, and this for the purpose of permitting the slides G to be moved bodily forward and backward in order to set their upper ends in operative position under the escapements or to move them backward out of engagement, so that they may be raised or lowered preparatory to engaging the escapements of another magazine. It is to be particularly noted that my organization admits of the use of any desired number of magazines—six or eight, if demanded—and this owing to the fact that the operative ends of the escapement-actuating devices are shiftable bodily from any one series of escapements to any other series at will.

I am aware that two fixed series of escapements have been combined with a series of intermediate actuating-bars so pivoted that they can be thrown into action at one end or the other with one series of escapements or the other, as in United States Patent No. 787,817; but this arrangement permits the use of two magazines only, and in this regard it differs materially from that herein shown and is incapable of securing the same results. I believe myself to be the first to produce in any form a machine containing three, four, or more magazines and a like number of series of escapements in combination with a single keyboard and intermediate actuating devices shiftable at will to engage the escapements of any one of the series. The means for effecting the adjustment of the frame F and the bars G will be hereinafter described in detail.

I is a stationary upright raceway fixed to the front of the frame and divided by partitions $i$ into a series of channels into which the matrices are delivered from the magazines and through which they descend to an inclined assembling-belt J, which delivers them one after another into the channeled assembler K, in which they are assembled or collected side by side in a common line.

L is a vertically-movable bridge or plate secured to the upper end of the vertically-sliding frame F for the purpose of bridging over the space between that magazine which is for the time being in use and the raceway I, so that the released matrices may pass smoothly and without interruption from the magazine over this bridge into the raceway. As the frame F is raised and lowered to set the escapement-actuating slides in position to engage the escapements of one magazine or another the bridge L is adjusted to correspond, so that it will connect with that particular magazine the escapements of which are to be actuated. Thus it will be seen that the movement of the frame F effects the vertical adjustment of both the bridge L and the actuating-slides G so that they will coöperate with one and the same magazine.

Figure 4:
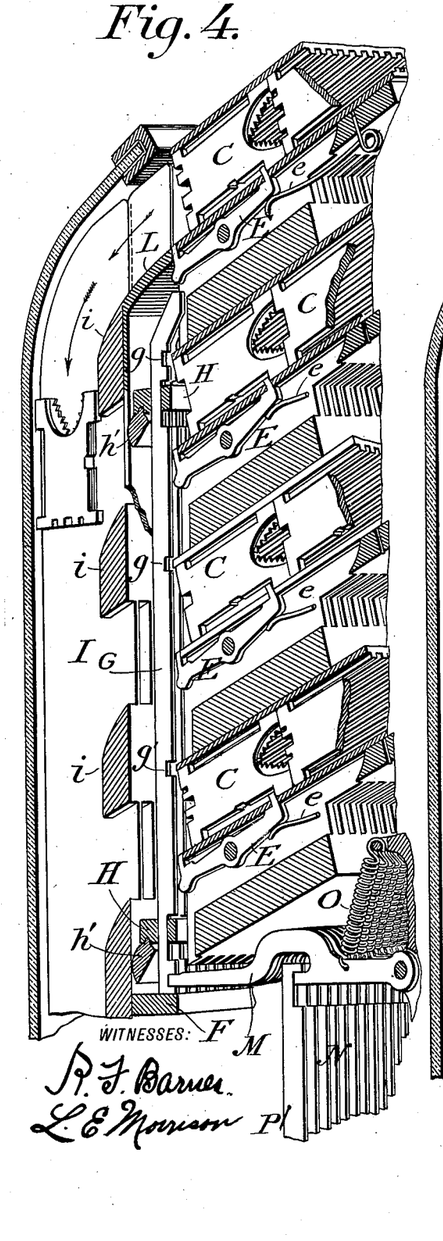
Fig. 4 is a vertical section in perspective through the forward end of the magazine and the mechanism for releasing and guiding the matrices with parts adjusted to deliver matrices from the top magazine.
Figure 5:
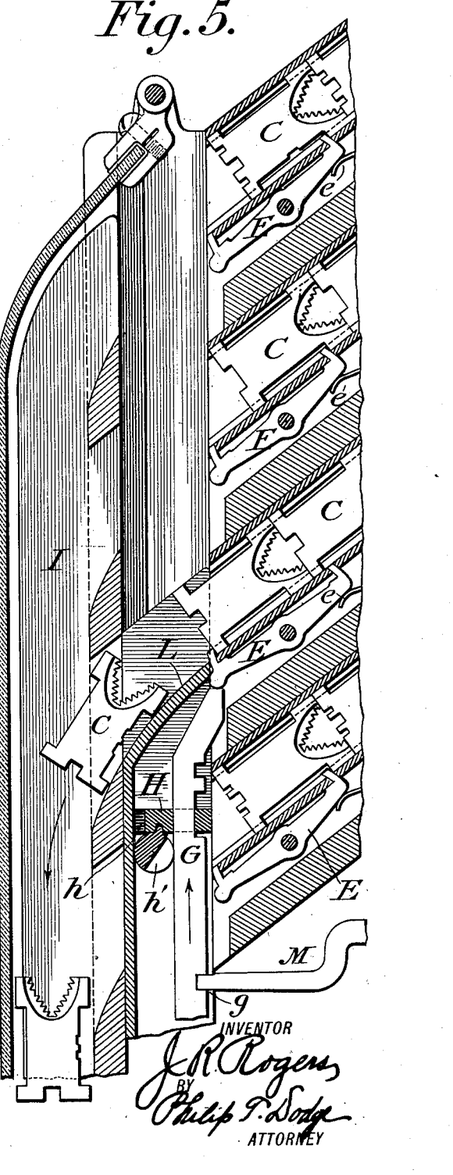
Fig. 5 is a similar section, not in perspective, with the parts adjusted to deliver matrices from an intermediate magazine.

When the machine is in action, the frame F remains at rest and the actuating-slides G have a limited vertical motion therein. This motion is imparted to each slide by a horizontal lever M, mounted at one end on a fixed pivot $m$, engaged at the opposite end in a notch in the slide G and acted upon at the middle by a reciprocating reed N, the rising movement of which is effected by a finger-key mechanism, preferably such as that used in existing linotype-machines and shown in United States Letters Patent No. 530,931. The levers M are each urged upward by a spring O, but held normally downward by the reed N, which is in turn urged constantly downward by a spring P. When a finger-key is actuated, the corresponding reed N is lifted, releasing the lever M, which is immediately lifted by the spring O, so that it causes the slide G to rise beneath the escapement and move it from its normal position. The reed being immediately released is again pulled downward, causing the slide G to descend and release the escapement, the position of which is reversed by a spring $e$, thereby discharging the matrix and permitting the second matrix to advance to the front. As the actuating-levers M are fixed in position, while the slides G are adjusted upward and downward with the frame F, it follows that the levers must engage the slides at one point or another, according to the height at which the slides are adjusted. To this end each actuating-slide G is provided with several notches $g$, one for each magazine, and their guide-bars H arranged, as before described, for movement forward and backward. Before the frame F is moved the bars H are drawn forward, carrying the upper end of the slides G out from under the escapements and at the same time disengaging each slide from its actuating-lever M. The frame F is then moved until the actuating-slides G are at the proper height, after which the guide-bars H are moved rearward, thereby causing the upper ends of the slides G to pass beneath the proper series of escapements and the lower portions of the slides to reëngage the actuating-levers M at a new point. This action will be understood on reference to Figs. 4 and 5. In Fig. 4 the slides are in position to engage the uppermost series of escapements, and the levers M are engaged in the lowermost notches of the slides, while in Fig. 5 the slides G are in position to operate next to the lowest series of escapements and the levers M are engaged in one of the upper notches of the slides.

Figure 1:
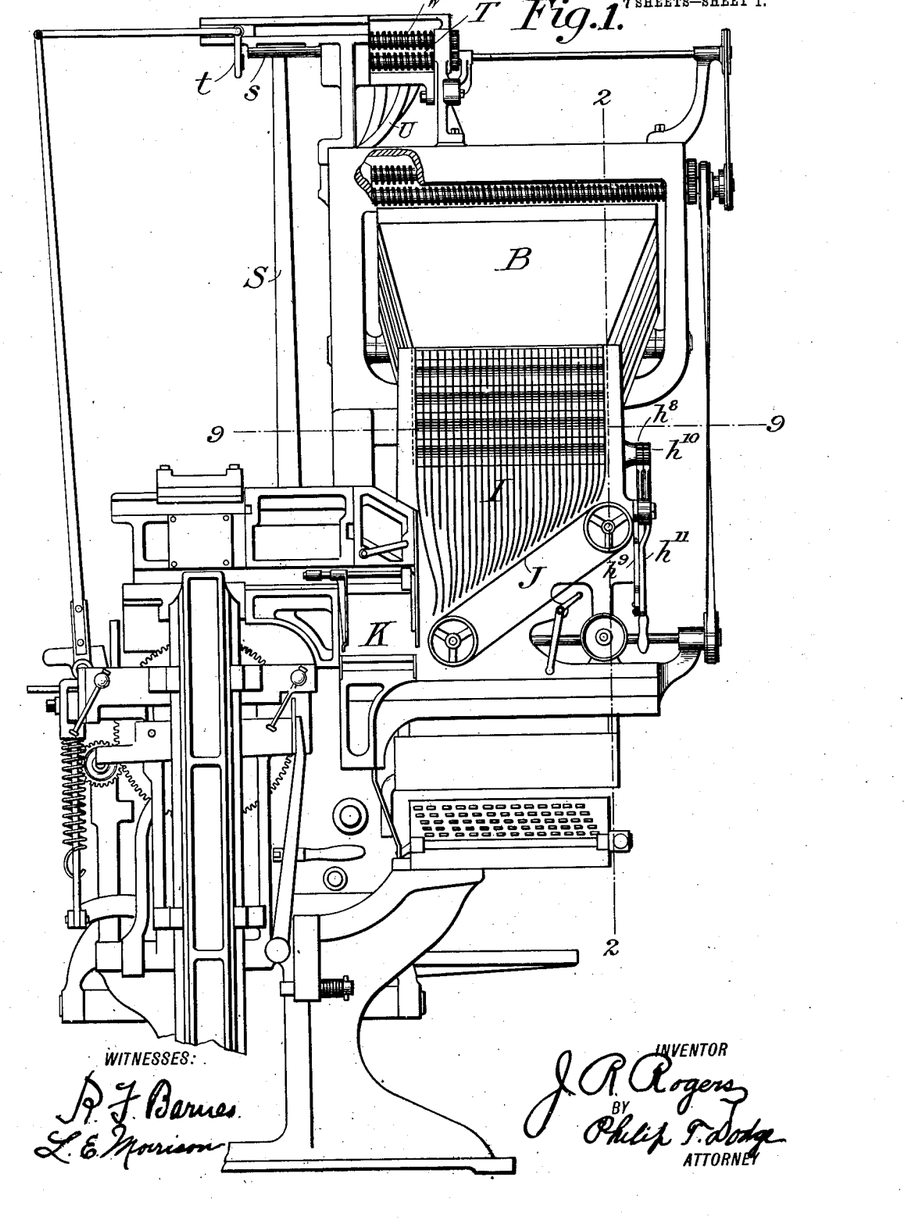
Figure 1 is a front elevation of the machine.
Figure 2:
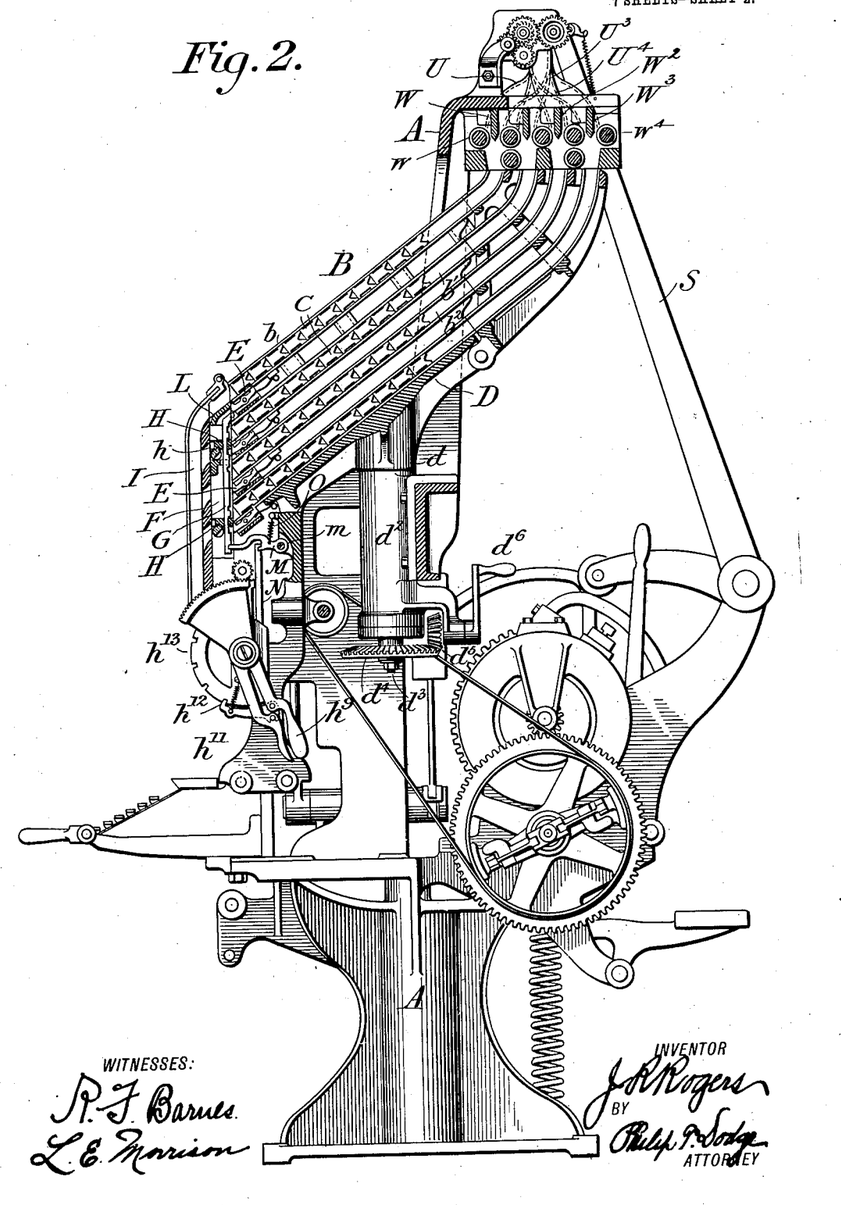
Fig. 2 is a vertical section from front to rear on the line 2 2, Fig. 1.
Figures 3, 3A:
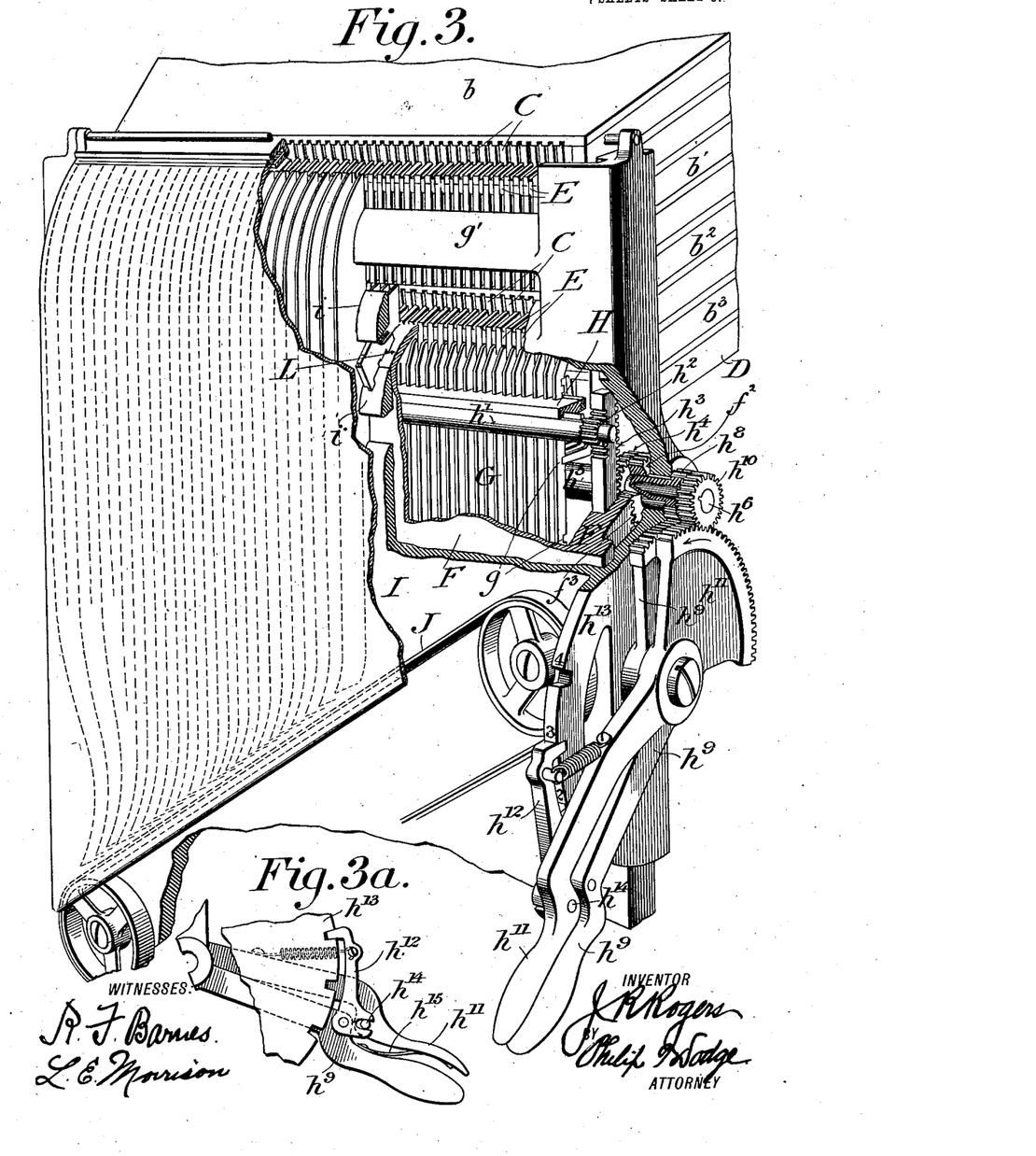
Fig. 3 is a perspective view looking toward the front right-hand corner of the magazines and attendant parts with portions broken away to expose the internal construction.
Figures 8, 9:
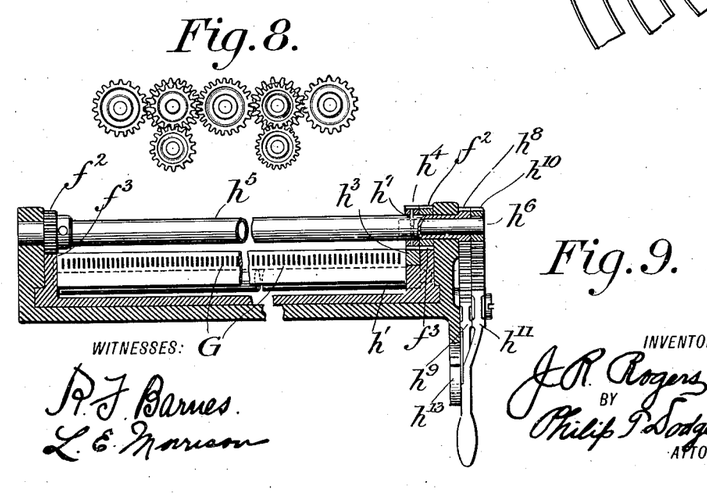
Fig. 8 is an end elevation of the gear-train for operating the distributer-screws.
Fig. 9 is a horizontal section on the line 9 9, Figs. 1 and 2, looking in a downward direction.

For the purpose of effecting vertical movement of the frame and the contained slides and of effecting the forward and backward movement of the latter I adopt the following construction: In the frame F, below each guide-bar H, I mount a rock-shaft $h'$, having on the upper side a rib or tooth to engage and move the guide. At their upper ends these two rock-shafts are connected, through pinions $h^2$, with a vertical rack-bar $h^3$, the movement of which causes the simultaneous equal rotation of the two rock-shafts $h'$, whereby the two guides H are moved forward or backward. This rack-bar is mounted to slide vertically in the frame F, as shown in Figs. 3 and 9, and to receive motion from a pinion $h^4$, having a limited rotary motion on a tubular shaft $h^5$, seated in the main frame. The pinion $h^4$ receives motion from a short shaft $h^6$, seated in the end of the shaft $h^5$ and carrying a transverse pin $h^7$, projected outward through slots in the surrounding shaft to carry the pinion $h'$. The limited rotation of shaft $h^6$ within the outer shaft causes the movement of the rack-bar $h^3$ and through the intermediate parts causes the escapement-actuating slides G to be moved forward and backward to and from their operative positions.

The vertical adjustment of the frame F and the slides G therein is effected by pinions $f^2$, secured on the ends of the shaft $h^5$ and engaging vertical racks $f^3$ on the frame F, as shown in Figs. 3 and 9. The shaft $h^5$ is provided at its outer end with an actuating-pinion $h^8$, which receives motion from a sector-gear on the end of a hand-lever $h^9$, pivoted to the main frame. The shaft $h^6$ for shifting the guide-bars H is provided with an actuating-pinion $h^{10}$, actuated by a sector-gear on the end of a hand-lever $h^{11}$, mounted on the same pivot as the lever $h^9$. It is necessary that the vertically-sliding frame F shall be locked in its different positions in order that the escapement-actuating slides and the shelf L may bear their proper relations to the adjacent magazine, and it is also necessary that the actuating-slides G shall be shifted forward out of engagement before the frame F is moved and shifted rearward after the frame F has been moved. In order to secure these actions in the proper order, I pivot to the lever $h^9$ a locking-dog $h^{12}$, adapted to engage in notches in a fixed plate $h^{13}$, its effect being to hold the lever $h^9$, and thereby keep the frame F in operative relation to one magazine or another. I also provide the lever $h^{11}$ with a pin $h^{14}$, extending into a slot in the latch $h^{12}$. The two levers are urged apart by an intervening spring $h^{15}$, as shown in Fig. 3$^a$, the effect of which to the intervening parts is to hold the guide-bars H in their rearmost position, with the slides G in operative relation to one series of escapements. The ends of the two levers are overlapped in such manner that they may be grasped by the hand and pressed together. The first effect of this action is to move the lever $h^{11}$ and withdraw the latch $h^{12}$, at the same time turning the pinion $h^{10}$, causing the guide-bars H to retrace the escapement-actuating slides G from their operative positions. As these movements are completed the latch $h^{12}$ disengages from the locking-plate and the two levers move together around their common axis. The gear on the end of the lever $h^9$, turning the pinion $h^8$, causes the frame F to rise or fall. When it has arrived at the proper point, the levers are permitted to separate and the latch $h^{13}$ falling into another notch holds the lever $h^9$ and frame F in place. As the separation of the levers continues and while the latch is passing into the notch the lever $h^{11}$ turns in relation to its companion, thereby turning the pinion $h^{10}$ and causing the guide-bars H to move the slides G to their operative positions.

From the foregoing it will be understood that in order to bring any desired set or series of matrices into use it is only necessary to shift the levers $h^9$ and $h^{11}$, an action which may be easily and instantly performed.

As before mentioned, the reeds N, from which motion is communicated, through levers M and slides G, to the escapements, are each controlled or actuated by a finger-key. While I recommend the keyboard mechanism represented in Letters Patent No. 530,931, it is to be understood that the reeds N may be actuated directly by the finger-keys or other suitable power-driven devices controlled by the finger-keys.

I believe the present to be the first instance in which a series of stationary magazines and corresponding series of escapements have been combined with actuating devices and a movable support adjustable bodily so that they may be set in operative relation with one set of escapements or another at will, and it is to be understood that I claim this combination broadly without regard to the form and arrangement of the details. I also believe myself to be the first to combine with a series of stationary magazines and a raceway or guide-plate, through which the matrices are delivered, an intermediate movable shelf or support to sustain the matrices between the ends of the magazines and the raceway, and this I claim broadly without regard to the details of construction. I also believe myself to be the first to combine with a series of stationary magazines and a corresponding series of escapements escapement-actuating devices which have reciprocating movement in action and capable of adjustment, first, from one series of escapements to another, and, second, into and out of engagement with the escapements, and it will be obvious to a skilled mechanic that the form of these actuating devices and their supports and the means for effecting such adjustments may be varied without changing the general mode of action or passing beyond the scope of my invention.

The magazines shown in the drawings consist each of two parallel plates suitably spaced apart and provided in their inner or opposing faces with longitudinal grooves or channels to receive and guide the edges of the matrices, the construction being essentially the same as in the present commercial machines. It is to be understood, however, that the magazines may be of any other equivalent construction adapted to properly guide the matrices. In the form shown the escapement devices consist each of a single piece in the form of a lever having a central pivot and upturned ends, which are projected alternately through the bottom of the magazine into the path of the matrices as the escapement is vibrated. The lower ends of the escapements are extended forward flush with the front ends of the magazines, or practically so, and made of suitable form to be engaged or acted upon by the slides G. Each escapement is seated in a groove in the under side of the magazine. It is to be understood that the escapements may be made in any other equivalent form—for example, in the form commonly used in linotype-machines, in which the upright pawls or dogs are jointed to the ends of the lever. It will be manifest to the skilled mechanic that the slides or devices for actuating the escapements and the parts for supporting and adjusting these slides may be varied in form and arrangement, provided only they are adapted to permit the adjustment of the actuating devices from one series of escapements to another. It is also to be understood that the devices for reciprocating the slides G may be modified in form and arrangement, provided only they are adapted to permit the vertical adjustment of the slides from one magazine to another and to impart motion to the slides in each of their operative positions.

After the matrices delivered from the magazine are assembled in line in the elevator K the line will be transferred to the mold, in which the slug or linotype will be cast against them, after which the line of matrices must be lifted to the top of the machine and the matrices returned through a distributing mechanism to the upper ends of the magazines. The entire casting mechanism, with means for transferring the matrices thereto and the means for lifting the matrices to the distributing mechanism, may be of any appropriate construction; but I recommend a construction such as that now employed in commercial linotype-machines and represented in Letters Patent of the United States No. 436,532 and No. 557,000, the leading parts of such mechanism being indicated in the present drawings. A detailed description is unnecessary herein, as these parts are foreign to the present invention.

Figure 6:
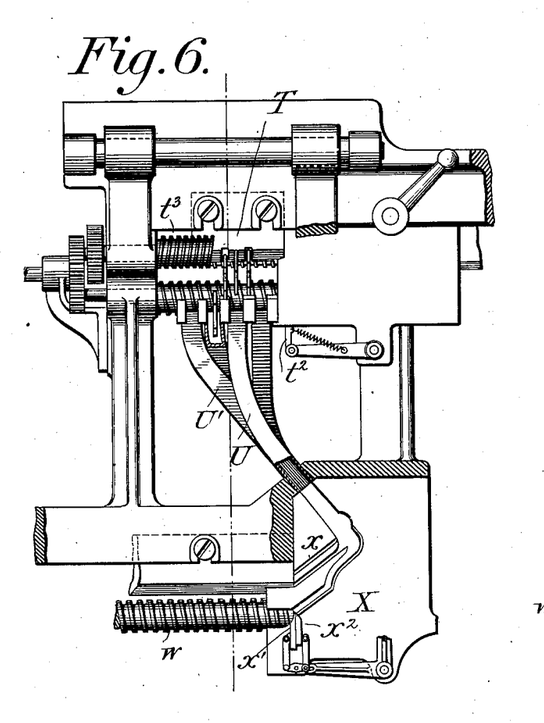
Fig. 6 is a rear elevation of a portion of the distributing mechanism with parts broken away to expose the interior.
Figure 7:
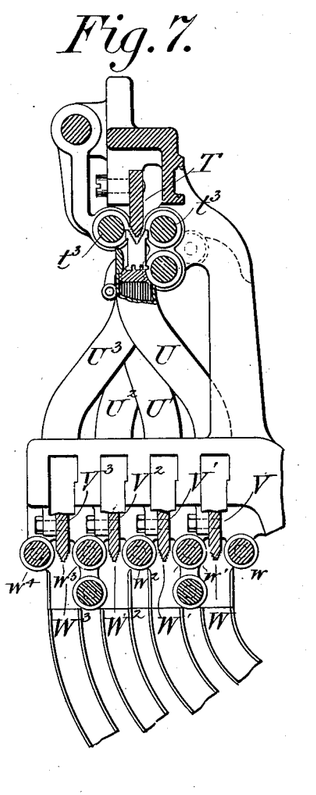
Fig. 7 is a cross-section on the line 7 7 of the preceding figure.

S represents a vertically-swinging arm such as used in the commercial linotype-machines and commonly known as a "second elevator." It carries at the upper end a horizontal toothed bar by which the composed line of matrices after being transferred from the casting mechanism is lifted to the composing mechanism. In the present machine the composed line may consist of matrices from any one of the magazines or of matrices from two or more magazines, and this renders necessary a distributing mechanism unlike that commonly employed. My mechanism includes means whereby the matrices are first selected or separated according to font, or, in other words, according to the magazines from which they were delivered, and, second, individual distributers by which the matrices of the different fonts are delivered to the appropriate channels of the respective magazines. These parts are shown particularly in Figs. 1, 2, 6, 7, and 8, in which T represents a short horizontal distributer-bar fixed to the frame and having its lower edge of V form provided with longitudinal teeth in four successive sets or groups varying in arrangement. This distributer-bar is of the same character as that represented in United States Letters Patent No. 347,629, dated August 17, 1886, its teeth being of suitable form to suspend the matrices by engaging corresponding teeth in the upper notched ends of the matrices, as in commercial linotype-machines of the present day. When the bar $s$ lifting the matrix-line reaches its uppermost position, it stands adjacent to the distributer-bar T and in the path of the horizontal slide $t$, which pushes the line forward, so that the matrices are successively engaged by the lifting-finger $t^2$, Fig. 6, and carried upward between the screws $t^3$, whereby the matrices are advanced into engagement with and along the bar T. The teeth of the matrices bear such relation to those of the bar that all matrices belonging to different fonts or sets are released at different points, all matrices belonging to each set being released at the same point. The action of these distributing and separating devices, including the lifting-finger $t^2$, in this respect is similar to the action of the distributing devices in the commercial linotype-machine.

The individual distributers V V' of the respective magazines are of the ordinary linotype construction, which is represented in United States Letters Patent No. 347,629 and No. 436,532, consisting each of the stationary distributer-bar proper extending lengthwise across the upper end of the magazine and provided, like the upper bar T, with longitudinal permuted teeth along the lower V-shaped edge, so that the matrices having their teeth permuted to correspond will be suspended by their teeth engaging those of the bar as they are moved along the latter until they arrive over their appropriate channels, when they are released and permitted to fall through the disengagement of the teeth. Parallel with the distributer-bars there is a series of constantly-rotating screws $w\ w'$, &c., which serve, as usual, to engage the edges of the matrices and carry them along the bars. The several distributer-bars W W', &c., are preferably alike as to the arrangement of their teeth, and the different fonts of matrices intended for the respective magazines are also alike as to the arrangement of the distributing-teeth, except as to those teeth which coöperate with the upper bar T to effect the preliminary separation according to font. Each of the chutes U U', &c., leading down from the font-distinguisher, directs its matrices to one of the lifting mechanisms X X' X², &c., each including inclined rails $x$, which guide the matrices one after another to alternately-acting pawls $x'\ x^2$, by which the matrices are separated and permitted to slide down one after another between the threads of the adjacent carrier-screws $w\ w'$, by which the matrices are advanced laterally into engagement with and along the distributer-bar.

To recapitulate, the composed lines of matrices entering at the high level, are disintegrated by the upper lift $t^2$ and the matrices advanced along the upper bar T to the adjacent screws. The bar separates the matrices according to font and permits them to fall through the chutes U U', &c., into the respective lifting devices X X', &c., where the lower lifts $x^2$ effect their delivery one at a time to the lower distributer-bars W W', &c., along which they are carried until they are dropped into the appropriate channels. It will be observed that distribution to the several magazines may be carried on at one time and that the operation may be continuous without reference to the magazines from which matrices are being delivered at the moment and without reference to the particular magazines from which the matrices in course of distribution were delivered. In other words, my machine admits of composition being carried on at will from either of the magazines, of the faces being composed singly or jointly in the line, and of the distribution being carried on continuously without regard to the action of any other part of the machine.

While the series of magazines may be permanently connected in any suitable manner and permanently mounted on the machine, I prefer to construct and arrange them in such manner that they may be individually removed and replaced by others containing different fonts of matrices, and this to the end that the assortment of matrices in the machine may be quickly varied without the trouble of removing them from the magazines.

Figure 10:
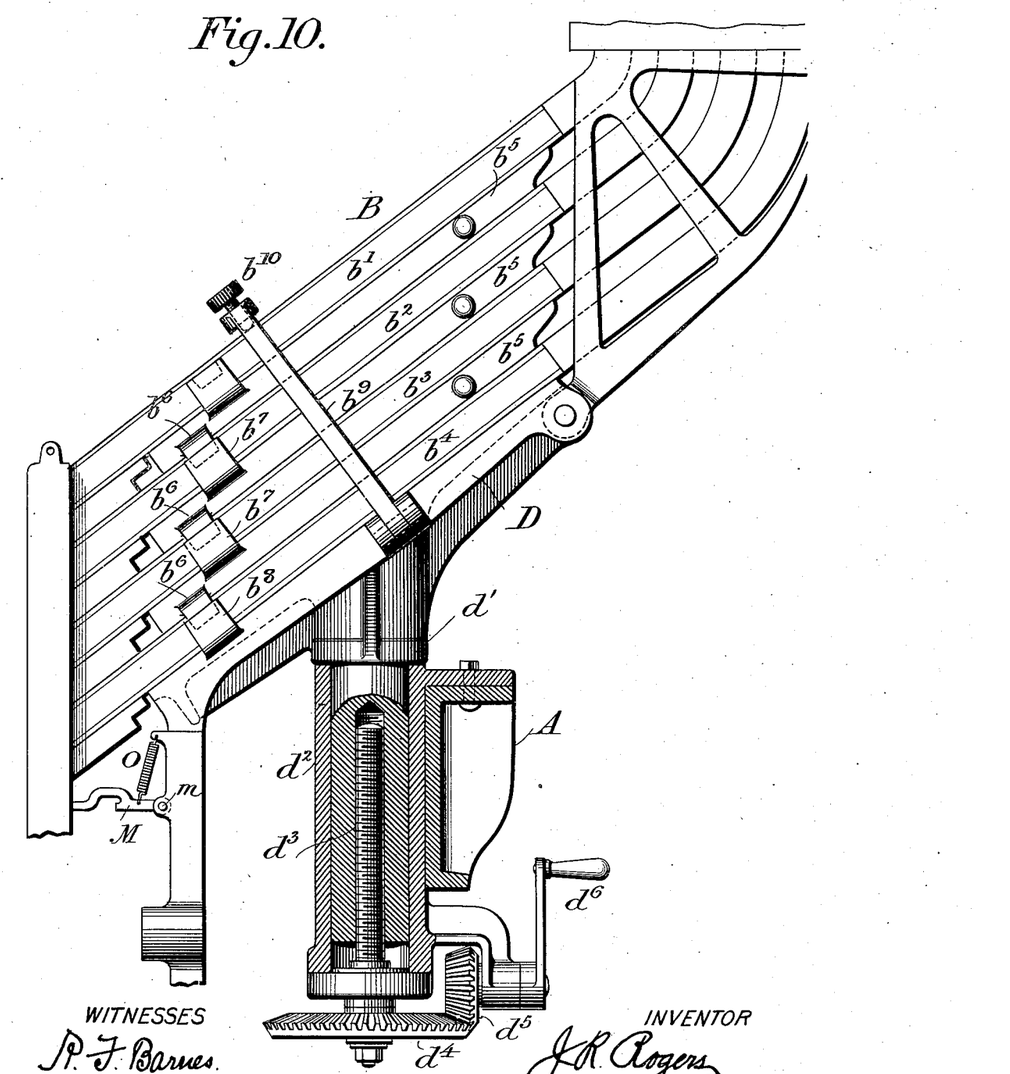
Fig. 10 is a side elevation, on a larger scale, illustrating one manner of securing the individual magazines so that they may be separately removed and exchanged for others containing different fonts of matrices.
Figure 11:
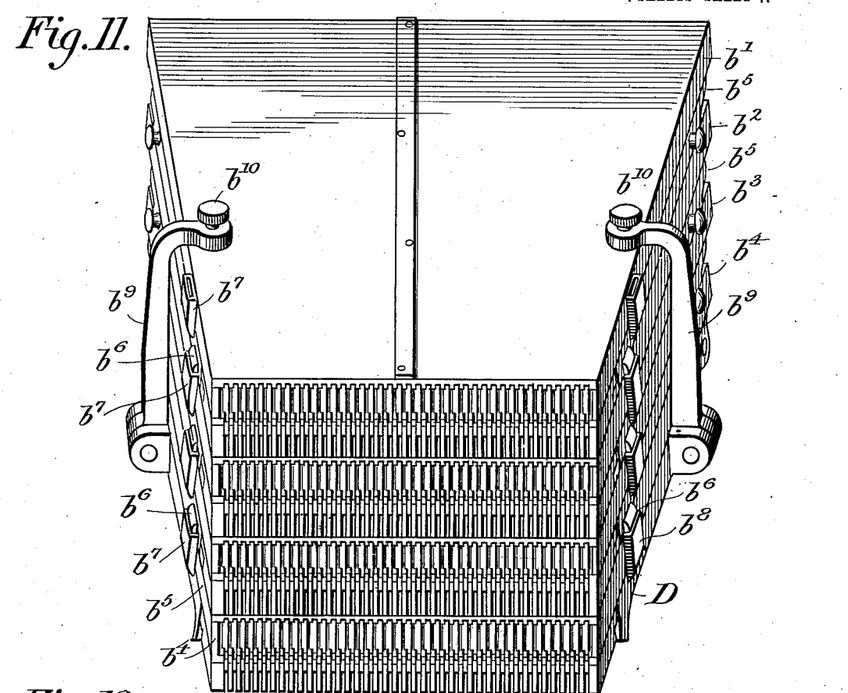
Fig. 11 is a front end view of the series of magazines shown in the preceding figure.
Figure 12:
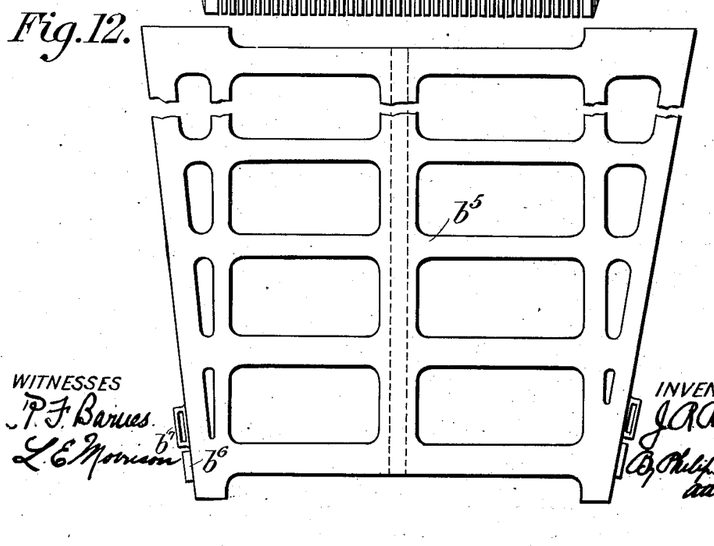
Fig. 12 is a plan view of one of the magazine bottom frames.

Referring to Figs. 10, 11, and 12, they show each of the magazines provided with a light skeleton bottom plate or frame $b^5$, such as shown in Fig. 12, secured thereto. Each of these frames is flanged on the under side to bear on top of the magazine below, and each frame is also provided with a downwardly-turned arm $b^6$ with an upwardly-turned socket $b^7$. When the magazines are placed one above another, as shown, the arm of each extends downward into the socket of the one below. The base-frame D is also provided with a socket $b^8$. When the magazines are assembled one upon another, they will interlock and also interlock with the base-frame in such manner that they will prevent it from shifting out of its proper relation. The only essential requirement in this respect is the formation on the respective magazines and the base-frame of such projections or surfaces that they will interlock and maintain their proper relations, while at the same time the ready separation of the magazines is permitted. In order to hold the magazines down compactly in place and prevent them from springing or twisting out of shape, I propose to use any suitable confining or locking devices—such, for example, as the arms $b^9$, hinged at their lower ends to the base-frame D and having their upper ends bent inward to overlap the magazines and provided with screws $b^{10}$ or equivalent pressure devices. When the screws are released, the arms may be turned outward, lifting the magazines free for removal and replacement.

In order to permit the convenient removal of the magazine or magazines without disturbing the other parts of the machine, I propose to mount the entire system of magazines in such manner that it may be raised bodily clear of the front channel I, so that the magazines may be moved in a forward and downward direction at the front of the machine. To this end I have shown the frame D as supported by a central column $d'$, mounted to slide upward and downward in a tubular support or bracket $d^2$ on the main frame. A vertical screw $d^3$, mounted to turn in the main frame, but fixed against vertical motion, is threaded into the lower end of the column $d'$ and connected through intermediate gears $d^4$ and $d^5$ with a hand-crank $d^6$. By turning the crank and rotating the screw the column $d'$, the base-frame D, and the entire series of magazines may be lifted to the desired height and sustained in position while the substitution of magazines is taking place. It is manifest that the screw may be replaced by any other appropriate means for raising and lowering the base-frame.

What I claim as my invention is—

1. In a linotype-machine, plural magazines and a series of escapements for each magazine, in combination with a series of actuating devices and a movable support therefor whereby said devices may be moved bodily at will into operative relation to one set of escapements or another, whereby the escapements of either magazine may be actuated to the exclusion of the others.

2. In a linotype-machine, plural magazines and a series of escapements for each magazine, in combination with a series of finger-keys, and intermediate actuating devices having one end adjustable at will to engage the escapements of any one series.

3. In a linotype-machine, three or more fixed magazines and a series of escapements for each magazine, in combination with a fixed keyboard mechanism and intermediate escapement-actuating devices adjustable endwise in relation to the keyboard mechanism for connection with the escapements of any one magazine at will.

4. In a linotype-machine, plural stationary magazines, and a series of escapements for each magazine, in combination with a fixed keyboard, a series of reeds actuated thereby, and a series of slides longitudinally adjustable adapted to connect the reeds with any series of escapements at will.

5. In a linotype-machine, three stationary magazines, one overlying another, each provided with a series of escapement-levers, and escapement-actuating devices adjustable at will to directly engage the escapements of any magazine.

6. In a linotype-machine, a series of superposed magazines, an upright raceway to receive matrices from all the magazines, and an intermediate adjustable bridge or support to carry the matrices from one magazine at a time to the raceway.

7. A series of superposed magazines, each having a series of escapements arranged to deliver matrices at their lower ends, and a raceway I to receive the matrices, in combination with an intermediate vertically-adjustable bridge L.

8. A series of superposed magazines, an upright raceway I to receive the matrices from all the magazines, and an intermediate vertically-adjustable frame carrying a bridge to support the matrices from the magazine to the raceway, and also carrying means for actuating the escapements.

9. A series of magazines each provided with escapements, in combination with the escapement-actuating rods G, their guides H movable to and from the magazines, and the vertically-movable frame F carrying the guides H.

10. A series of magazines and corresponding series of escapements in combination with escapement-actuating devices, means for imparting a reciprocating motion to said devices, and means for adjusting said actuating devices vertically and for effecting their engagement with and disengagement from the escapements and the mechanism which operates them.

11. In combination, the series of magazines and their escapements, the vertical raceway I, the series of bars $i$, and vertically-movable bridge L.

12. In combination with the series of magazines and corresponding series of escapements, escapement-actuating slides G, the bridge L, and means for first disengaging the slides from the escapements and thereafter adjusting the slides and the bridge vertically, and vice versa.

13. In combination with a series of magazines and escapements, escapement-actuating slides G, their adjustable supporting-bars H, a vertically-movable frame carrying said bars, hand-levers $h^9$ and $h^{11}$ and intermediate connections through which said levers effect the adjustments of the frame F and slide G, substantially as described.

14. In combination with the vertically-movable frame F, the guides H movable therein, and slides G movable in the guides, the levers $h^9$ and $h^{11}$, the locking device $h^{12}$ connecting said levers, and connections between the respective levers, the frame F and guides H for effecting the movement of the frame and guides.

15. In a linotype-machine, the combination of the following elements; the series of superposed stationary magazines and corresponding series of escapements, an assembling mechanism, a raceway through which all the magazines deliver to said mechanism, a keyboard, and vertically-adjustable devices whereby the keyboard may be connected with the escapements of any magazine at will to the exclusion of the others.

16. In a linotype-machine, plural magazines each combined with a distributer, a matrix separating and feeding mechanism in advance of each of said distributers, and a font-distributer arranged to deliver the matrices of the respective fonts to the respective separators whereby the matrices belonging to different fonts are delivered from the composed line to the respective separators, and delivered by the latter, one at a time, to the respective magazine-distributers.

17. In a linotype-machine, a series of superposed magazines removable and separable at will, a base-frame supporting the series, and means connected with the base-frame and acting to urge the magazines downward; whereby they are seated firmly upon one another and upon the base-frame, and prevented from twisting out of form or moving out of position.

18. In combination with a series of superposed magazines, the base-frame, and the hinged arms provided with means for clamping the magazines in place.

19. In a linotype-machine, and in combination with a base-frame, an independently-removable magazine overlying the same, and means for binding the magazine down firmly upon the base-frame.

In testimony whereof I hereunto set my hand, this 25th day of January, 1906, in the presence of two attesting witnesses.

JOHN R. ROGERS.

Witnesses:
P. T. DODGE,
J. F. GEORGE.